United States Patent [19]
Meuser

[11] 3,976,969  
[45] Aug. 24, 1976

[54] UNDERWATER SOUND WAVE DIRECTION FINDING SYSTEM

[75] Inventor: Wilfried Meuser, Bremen-Borgfeld, Germany

[73] Assignee: Fried. Krupp Gesellschaft mit beschrankter Haftung, Essen, Germany

[22] Filed: Mar. 11, 1975

[21] Appl. No.: 557,374

[30] Foreign Application Priority Data
Mar. 21, 1974 Germany.............................. 2413544

[52] U.S. Cl................................................. 340/6 R
[51] Int. Cl.²........................................... G01S 3/80
[58] Field of Search............................. 340/6 R, 16 R

[56] References Cited
UNITED STATES PATENTS

| | | | |
|---|---|---|---|
| 2,349,370 | 5/1944 | Orner.................................. | 340/6 R |
| 3,464,056 | 8/1969 | Ziehm et al.......................... | 340/6 R |
| 3,588,797 | 6/1971 | Ziehm et al.......................... | 340/6 R |

Primary Examiner—Richard A. Farley  
Attorney, Agent, or Firm—Spencer & Kaye

[57] ABSTRACT

In apparatus for determining the direction of impinging sound waves according to the sum/difference principle, by forming a sum signal and two difference signals in a gradient ranging system composed of four omnidirectional piezoelectric hydrophones arranged in two pairs oriented orthogonally to each other, the hydrophones of each pair are conductively connected together to form a loop in which each terminal of each hydrophone is connected by a short circuit connection to a respective terminal of the other hydrophone of the same pair and the sum signal is derived by producing a signal proportional to the sum of the currents in the two loops and integrating such signal with respect to time.

5 Claims, 3 Drawing Figures

UNDERWATER SOUND WAVE DIRECTION FINDING SYSTEM

BACKGROUND OF THE INVENTION

The present invention relates to a method and apparatus for the detection of sound waves.

In systems for determining the direction of sound waves in water, it is known to form a sum signal and two difference signals to indicate the direction of impinging sound waves in a bearing indicator operating according to the sum/difference principle, and to employ a receiving arrangement constituted by a gradient ranging system having four omnidirectional piezoelectric hydrophones spaced from one another at a distance which is small compared to the wavelength of the sound waves to be received, the hydrophones being arranged in groups of two hydrophone pairs which are orthogonal to one another.

In order to indicate the direction of impinging sound waves through water according to the sum/difference principle, it is desirable to be able to form sum/difference signals also from sound waves of very low frequencies since a particularly high proportion of the sound energy produced by water vehicles is in the very low frequency range; this energy originates from the drive assembly and from the resonances generated in the water vehicles by the drive assembly.

Reference herein to a very low frequency range is intended to mean substantially a frequency range below 30 Hertz.

It is known to form the sum/difference signals from the signal voltages prouduced in the hydrophones of such a receiving arrangement via sum-and-difference amplifiers.

Thus German Pat. No. 1,566,858, and corresponding U.S. Pat. No. 3,496,527, issued to Günter Ziehm et al on February 17th, 1970, disclose an arrangement of sum-and-difference amplifiers whose output signals are fed to a cathode-ray tube which constitutes the bearing indicator of the system.

German Pat. No. 1,566,837, and corresponding U.S. Pat. No. 3,464,056, issued to Günter Ziehm et al on August 26th, 1969, disclose a similar arrangement in which the output signals of the sum-and-difference amplifiers are indicated after a correlating evaluation.

However, these arrangements have the drawback that they do not permit a ranging indication based on very low frequency sound waves through water.

The frequency response of the hydrophones has a lower limit, which is determined by the insulation resistance of the hydrophones, and at very low frequencies this resistance may already by small compared to the capacitive impedance of the hydrophones and forms a frequency dependent voltage divider. This phenomenon and an equivalent circuit of a hydrophone are described in a data book for designers by Brush Clevite, copyright 1966. Practical values of the capacitance $C_e$ resistance $R_c$ of a hydrophone are for instance: $C_e = 2nF^e$; $R_c = 1$ M $\Omega$ or 10 M $\Omega$, with these values, the lower frequency limit is 100 cps or 10 cps.

Due to this frequency dependence, phase errors occur in the formation of sum/difference signals for very low frequencies and such errors substantially falsify the direction indication, even if sound waves are received whose frequencies are higher by one order of magnitude than the frequency limit of the hydrophones.

SUMMARY OF THE INVENTION

It is an object of the present invention to overcome such drawbacks in a receiving system having two crossed pairs of hydrophones which form sum/difference signals for the direction indication of impinging sound waves through water even at very low frequencies.

This and other objects of the present invention are accomplished by coupling two hydrophones of each pair of hydrophones in a short-circuit series connection by means of conductive connections, and by connecting the circuit to cause the sum signal to be formed by an addition of the electrical currents in the two short-circuit series circuits and by subsequent integration, to cause a first difference signal to be formed from the potential difference between the connections of the one pair of hydrophones, and to cause the second difference signal to be formed from the potential difference between the connections of the other pair of hydrophones.

According to a further feature of the invention, only a single ammeter is used to measure the currents in both pairs of hydrophones together and has its two inputs connected into a conductive connection of the one hydrophone pair as well as of the other hydrophone pair and an integrator is connected in series with the ammeter.

According to a further feature of the invention, an integrating ammeter is provided which is designed according to the known principle of a charge amplifier and which operates as an operational amplifier connected in feedback via a capacitor and a resistor.

The advantage of the present invention is, in particular, that it is possible to form, with one receiving system having two cross pairs of hydrophones, a sum signal and two difference signals to indicate the direction of impinging sound waves through water, even for sound waves of very low frequencies, with a minimum of circuitry.

By determining and integrating the short-circuit currents which, due to capacitive internal resistance of the hydrophones correspond to the time differentiated sound pressure signal, a formation of sum/difference signals of sound waves through water is possible even for very low frequencies since the insulation resistances of the hydrophones are bridged by the short-circuit connection and thus can no longer exert any influence on the frequency curve of the hydrophones.

Thus the influence of long-term changes in the insulation resistances of the hydrophones, as they may occur with extended use of the hydrophones in sea water and which may produce varying frequency curves for the signal voltages of each individual hydrophone, are eliminated with the apparatus according to the present invention.

DESCRIPTION OF THE PREFERRED EMBODIMENTS

Figure 1:
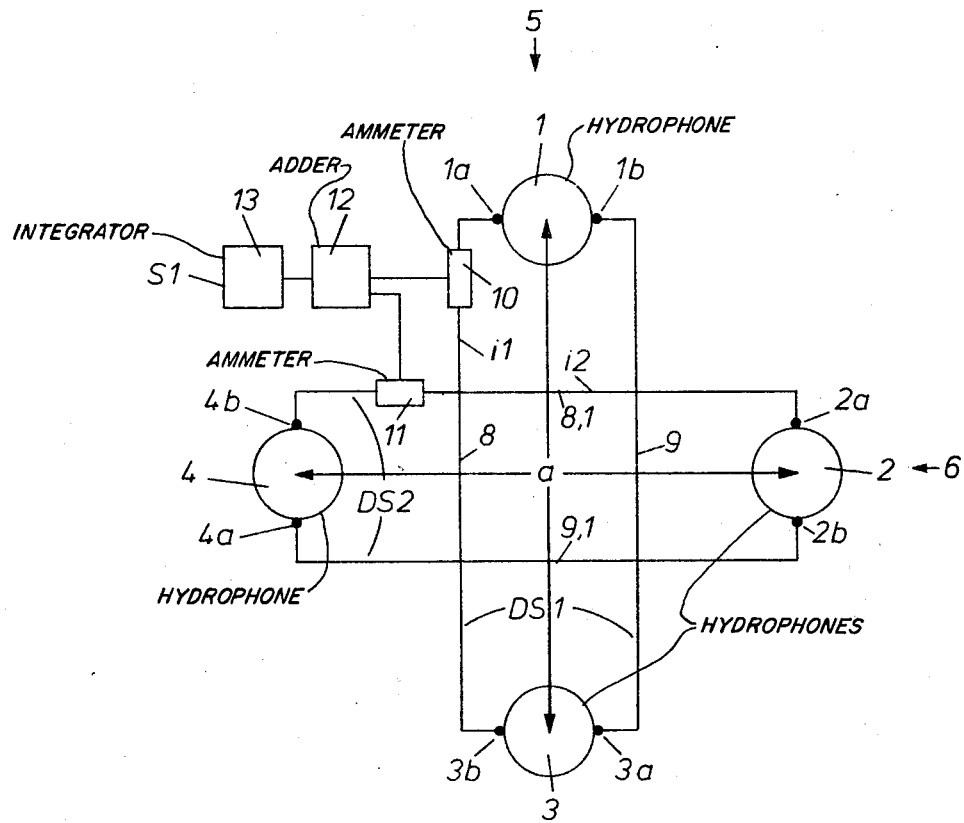
FIG. 1 is a block circuit diagram of one preferred arrangement according to the present invention.

In order to form a sum signal, S1, and two difference signals, DS1 and DS2, to indicate the direction of impinging sound waves, the receiving arrangement shown in FIG. 1 includes four omnidirectional hydrophones 1, 2, 3 and 4, arranged as two hydrophone pairs 5 and 6, the hydrophones 1 and 3 forming pair 5 and the hydrophones 2 and 4 forming pair 6.

The hydrophone pairs 5 and 6 are arranged orthogonally to one another, i.e. angularly offset by 90° with respect to one another, hydrophones 1 and 3 being spaced apart by a distance a, as are hydrophones 2 and 4. Distance a is small compared to the wavelength of the sound waves to be received.

Each hydrophone 1–4 is provided with two terminals, a first terminal 1a – 4a and a second terminal 1b – 4b.

The two hydrophones 1, 3 or 2, 4, respectively, of each hydrophone pair 5 or 6 are coupled together by means of short-circuit series connections. The first hydrophone 1 of the first hydrophone pair 5 has its first terminal 1a coupled, via a connecting line 8, with the second terminal 3b of the second hydrophone 3 of the first hydrophone pair 5, and the second terminal 1b of the first hydrophone 1 is coupled, via a connecting line 9, with the first terminal 3a of the second hydrophone 3 of the first hydrophone pair 5.

The hydrophones 2, 4 of the second hydrophone pair 6 are connected in the same manner, a first terminal 2a of the first hydrophone 2 being coupled, via a connecting line 8.1, with the second terminal 4b of the second hydrophone 4 and the second terminal 2b of the first hydrophone 2 being coupled, via a connecting line 9.1, with the first terminal 4a of the second hydrophone 4.

Ammeters 10 and 11 are connected in the connecting lines 8 and 8.1, respectively, the outputs of the ammeters being connected to the inputs of an adder 12 connected in series with an integrator 13. At the output of the integrator 13 there appears the sum signal S1.

If the pressures on hydrophones 1 through 4 are equal, the short-circuit currents i1 and i2 in the hydrophone pairs 5 and 6 flow in the same direction, e.g. from the first terminal 1a or 2a of the first hydrophone 1 or 2 to the second terminal 3b or 4b of the other hydrophone 3 or 4 of each hydrophone pair.

A voltage corresponding to a first difference signal, DS1, is present between connecting lines 8 and 9 of the first hydrophone pair 5, and a voltage corresponding to a second difference signal, DS2, is present between connecting lines 8.1 and 9.1 of the second hydrophone pair 6.

Figure 2:
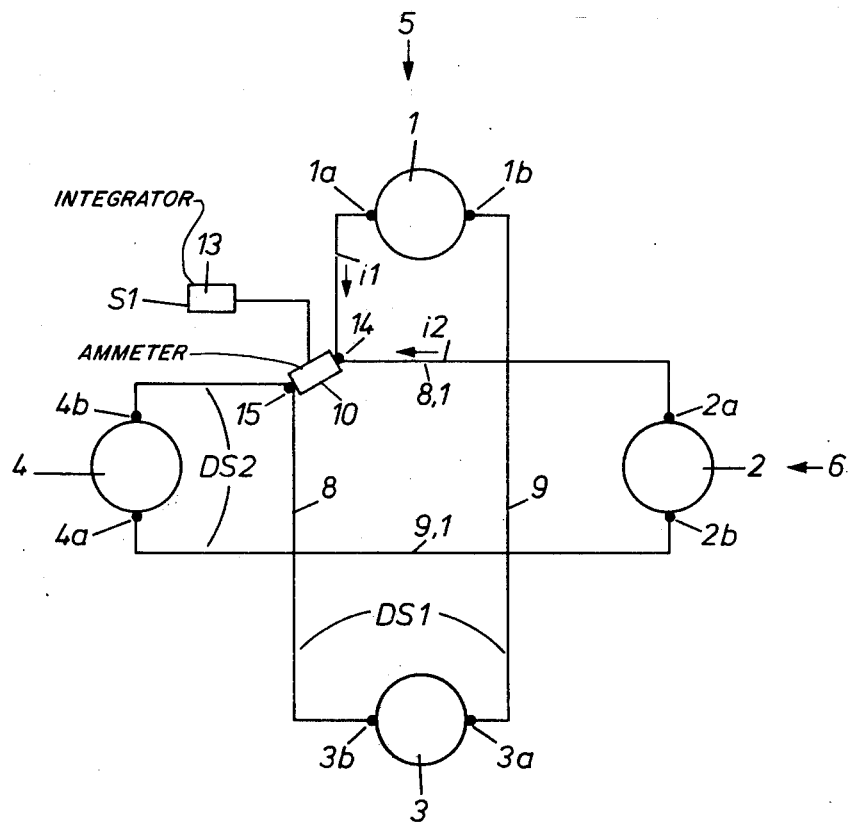
FIG. 2 is a block circuit diagram of the arrangement according to FIG. 1 provided with a single ammeter.

As shown in FIG. 2, a single common ammeter 10 can also be connected into the series-connected short-circuit circuits of the hydrophone pairs 5 and 6, the ammeter 10 having its inputs 14 and 15 connected into the connecting line 8 of the one hydrophone pair 5 as well as into the connecting line 8.1 of the other hydrophone pair 6.

In this case the first terminal 1a of the first hydrophone 1 of the first hydrophone pair 5 and the first terminal 2a of the first hydrophone 2 of the second hydrophone pair 6 are connected with the one input 14 of the ammeter 10. The second terminal 3b of the second hydrophone 3 of the first hydrophone pair 5 and the second terminal 4b of the second hydrophone 4 of the second hydrophone pair 6 are connected with the other input 15 of the ammeter 10.

Figure 3:
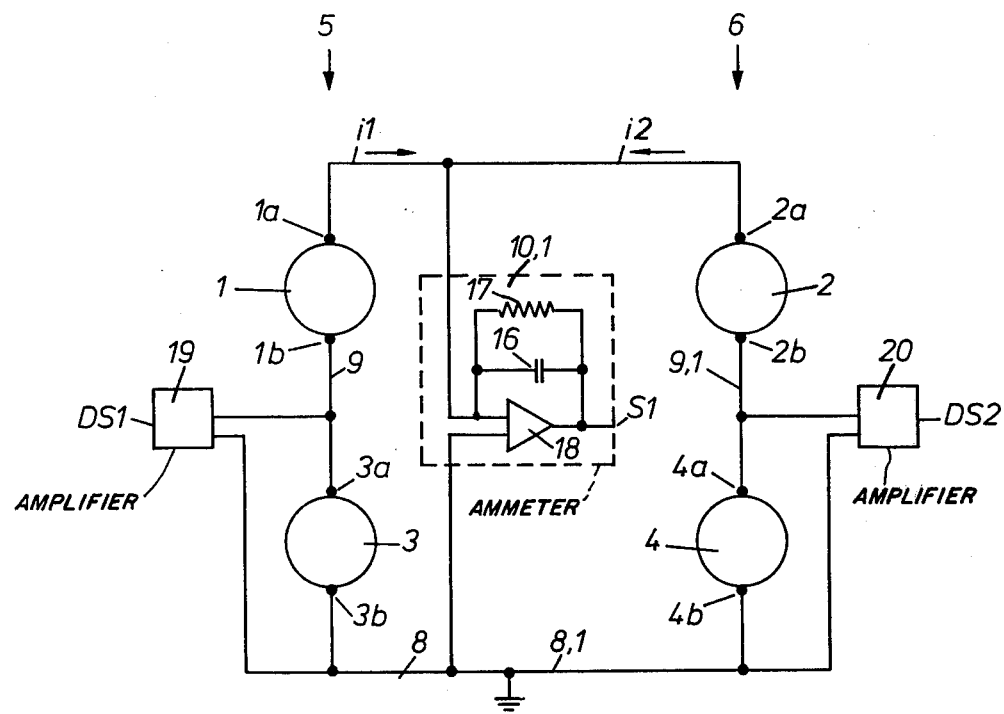
FIG. 3 is a circuit diagram of a specific embodiment of the arrangement according to FIG. 2.

As shown in the circuit arrangement of FIG. 3 in which the hydrophone pairs 5 and 6 are shown in a manner to facilitate understanding, the hydrophones 1, 3 and 2, 4 of the hydrophone pairs 5 and 6 are short-circuited via the common ammeter 10.1.

The short-circuit currents i1 and i2 in the hydrophone pairs 5 and 6 flow through the ammeter 10.1 in the same direction and the sum is formed there of the two short-circuit currents i1 and i2.

The ammeter 10.1 is designed as an integrating ammeter operating according to the principle of a charge amplifier, i.e. in the form of an operational amplifier 18 which is connected in feedback via a capacitor 16 and resistor 17 and in which the input terminal voltage is practically equal to zero.

The relationship between the values of capacitor 16 and resistor 17 in the feedback circuit is determined in a simple manner by the lower frequency limit of the sum signal S1, so that, for example, extremely slow pressure fluctuations can be separated from the desired sound range. The lower frequency limit of the desired sound range is about $10^{-2}$ cps, its upper frequency limit is about $5 \cdot 10^3$ cps. Therefore the frequency limit determined by capacitor 16 and resistor 17 must be $10^{-2}$ cps. This is achieved for example by a resistance of 10 M$\Omega$ and a capacitance of 1.6 $\mu$F. The operational amplifier 18, which is used, is an integrated circuit with an amplification factor of about 100 000.

Relative to a grounding point in the circuit where the second terminals 3b and 4b of the hydrophones 3 and 4 are grounded, the difference signals DS1, DS2 can be tapped above hydrophones 3 and 4.

The difference signals DS1 and DS2 can be amplified in voltage amplifiers 19 and 20 before they are fed, together with the sum signal S1 which has already been amplified in the operational amplifier 18, to a bearing indicator (not shown). Hydrophones used in connection with this circuit are piezoelectric ceramic elements which are described for instance in the U.S. Pat. No. 3,559,162 by E. A. Granfors et al., patented Jan. 26, 1971, especially column 3, lines 37 to 53.

It will be understood that the above description of the present invention is susceptible to various modifications, changes and adaptations, and the same are intended to be comprehended within the meaning and range of equivalents of the appended claims.

I claim:

1. In a method for determining the direction of impinging sound waves according to the sum/difference principle by forming a sum signal and two difference signals, in a gradient ranging receiving system composed of four omnidirectional piezoelectric hydrophones arranged at distances from one another which are small compared to the wavelength of the sound waves to be received, the hydrophones being arranged in two pairs which are angularly offset by 90° with respect to one another, the improvement comprising: conductively connecting together the two hydrophones of each pair to form a short-circuit series connection therebetween; forming the sum signal (S1) by algebraically adding the electrical currents in the two short-circuit series circuits formed by the two pairs and subsequently integrating the sum of the two currents; forming a first difference signal (DS1) on the basis of the potential difference across the hydrophones of one hydrophone pair; and forming a second difference signal (DS2) on the basis of the potential difference across the hydrophones of the hydrophone pair.

2. In a gradient ranging receiving system for use in an underwater sound detecting bearing indicator apparatus for determining the direction of impinging sound waves according to the sum/differnce principle, the receiving system being arranged to form a sum signal and two difference signals and including four omnidirectional piezoelectric hydrophones spaced apart by distances which are small compared to the wavelength of the sound waves to be received, each hydrophone having first and second output terminals and the hydrophones being arranged in two pairs, with one pair being oriented at 90° to the other pair, the improvement wherein said receiving system further comprises: conductive means connected between the terminals of each said pair of hydrophones for establishing a short circuit connection between the first terminal of each said hydrophone and the second terminal of the other hydrophone of its respective pair, whereby each said pair of hydrophones is connected in a closed current-conductive loop; current sensing means connected in series in each said loop for deriving an indication of the sum of the currents in the two loops; integrating means connected to said current sensing means for producing an output singal (S1) proportional to the time integral of the sum of the currents; and voltage responsive means connected across each said pair of hydrophones for producing difference signals (DS1, DS2) proportional to the respective voltages across each said hydrophone pair.

3. An arrangement as defined in claim 2 wherein said current sensing means comprises: two ammeters each connected in series in a respective one of said loops; and current adding means having inputs connected to the outputs of said ammeters, and having an output connected to the input of said integrating means.

4. An arrangement as defined in claim 2 wherein said current sensing means comprises a single ammeter connected in series in both of said loops at a location at which currents in said two loops flow in the same direction through said ammeter.

5. An arrangement as defined in claim 2 wherein said current sensing means and said integrating means are constituted by an integrating ammeter comprising an operational amplifier, and resistance means and capacitive means connected to form a feedback path for said amplifier.

* * * * *